United States Patent [19]

Graziano et al.

[11] 4,369,268

[45] Jan. 18, 1983

[54] ORGANOPOLYSILOXANE COATING COMPOSITIONS

[75] Inventors: Frank D. Graziano, Lake Bluff; Edmund J. Kuziemka, Naperville, both of Ill.

[73] Assignee: Material Sciences Corporation, Elk Grove Village, Ill.

[21] Appl. No.: 271,219

[22] Filed: Jun. 8, 1981

[51] Int. Cl.$^3$ .............................................. C08K 5/15
[52] U.S. Cl. ...................................... 523/435; 523/456
[58] Field of Search ................ 260/29.1 SB; 523/456, 523/435

[56] References Cited

U.S. PATENT DOCUMENTS

| | | | |
|---|---|---|---|
| 3,816,364 | 6/1974 | Bayer | 260/29.1 SB |
| 3,843,577 | 10/1974 | Keil | 260/29.1 SB |
| 4,028,339 | 6/1977 | Merrill | 528/15 |
| 4,262,043 | 4/1981 | Wald | 260/29.1 SB |

OTHER PUBLICATIONS

Polymer Molecular Weight Methods–ACS Advances in Chemistry Series 125, (1973), pp. 98–107.

Primary Examiner—Joseph L. Schofer
Assistant Examiner—N. Sarofim
Attorney, Agent, or Firm—Mason, Kolehmainen, Rathburn & Wyss

[57] ABSTRACT

Fast-curing resin compositions for coating metal surfaces are described. They comprise a high molecular weight epoxy resin, a low molecular weight epoxy resin, an etherified resol phenolic resin, a silicone fluid and an organopolysiloxane release resin, with an organometallic curing agent and a solvent. In addition to curing rapidly (one minute or less), the resin compositions are flexible and metal sheets coated therewith can be pressed or bent into various shapes and forms without the resin coating cracking or chipping.

7 Claims, No Drawings

ORGANOPOLYSILOXANE COATING COMPOSITIONS

BACKGROUND OF THE INVENTION

Silicone resin compositions have been described which are particularly applicable to baking utensils for release coatings. See for example the Merrill et al U.S. Pat. Nos. 3,786,015, 3,925,276 and 4,028,339. These patents describe silanol-containing silicone resin compositions which are particularly applicable as release agents for cooking and baking utensils. Such coating compositions, however, require extensive heat curing at relatively high temperature for an extended period of time after application to a metal surface. See for example U.S. Pat. No. 4,028,339 (col. 5) which describes the curing of a silanol-containing silicone resin composition at 425° F. for 45 minutes after application to tin-coated steel surfaces. Moreover, such silicone compositions are not particularly flexible and cannot be applied to metal sheets which are thereafter drawn and shaped into cooking utensils such as cups, pans and the like.

OBJECTS OF THE INVENTION

It is an object of this invention to provide silicone coating compositions which cure rapidly on the surfaces of metal objects and utensils with little or no post heating required. It is further object of this invention to provide silicone coating compositions which are flexible at ambient temperature and can be applied to metal surfaces which can thereafter be formed and shaped into various cooking utensils and similar objects without the resin coating cracking or chipping from the metal surface. It is a further object to provide silicone coating compositions which can be applied to metal sheets which are drawn thereafter without the coating composition cracking or breaking away from the metal surface. These and other objects are apparent from and are achieved in accordance with the following disclosure.

SUMMARY OF THE INVENTION

We have discovered that silicone compositions comprising an epoxy-phenolic resin system in high boiling solvent which contains a combination of a silanol-containing silicone releasing agent, a silicone fluid and an organometallic curing catalyst, form coatings which are rapidly cured in very short time-temperature cycles. These resin formulations can be readily applied to metal surfaces to form thin flexible films which provide excellent release properties for baked goods.

The resin coating, which can be applied directly to any metal surface such as steel, tinmill black plate, tin-free steel, aluminum, tinplate and the like, comprises a bisphenol-epichlorohydrin polymer of molecular weight in the range of 50,000 to 200,000 dissolved in high-boiling solvent such as Cellosolve ester or a high boiling ketone such as isophorone, combined with a low molecular weight (300–500) epoxy resin and an etherified resol bisphenol-epoxy resin, and containing a combination of silicones comprising a silanol-containing organopolysiloxane resin and an alkylphenylsiloxane fluid. The silicones and combinations thereof are described in U.S. Pat. Nos. 3,786,015 and 4,028,339, the disclosure of each of which is incorporated herein by reference.

While the silicone resin combinations are known to be release agents for food products the formulations thereof described in prior patents have certain disadvantages. They must be cured at relatively high temperature for rather long periods, and the cured coatings are relatively inflexible so that coated metal strips cannot be drawn or bent without cracking or destroying the coatings. In contrast, the formulations described herein can cure rapidly at ordinary temperature and the resulting coatings, applied to metal sheets, can be bent, drawn and pressed into desired shapes without the coating cracking or being deformed. These silicone formulations have obvious advantages over those of the prior art.

GENERAL DESCRIPTION OF THE INVENTION

This invention is a coating composition for metal surfaces which comprises a combination of constituents, as follows:

(A) A high molecular weight epoxy resin, preferably a bisphenol A-epichlorohydrin resin, although equivalent epoxy resins are also suitable. This resin constitutes about 10% to 25% of the total weight of the composition, and has a molecular weight in the range from 50,000 to 200,000 measured by gel permeation chromatography.

(B) An etherified resol-type phenolic resin, preferably a bisphenol-formaldehyde resol resin produced from bisphenol (1.0 mole) and 37% aqueous formaldehyde (1.5 moles) in the presence of an FDA-conforming basic catalyst. This resin constitutes a minor proportion of the composition, about 1% to 3% by weight.

(C) A low molecular weight epoxy resin, preferably an epichlorohydrin-bisphenol A type of molecular weight in the range from 300 to 500 and of epoxide equivalent from 175 to 200. This resin constitutes about 1% to 4% of the weight of the composition and serves as a plasticizer for the coating.

(D) A silicone fluid composed of a mixture of methylphenylsiloxanes, dimethylsiloxanes and diphenyldimethylsiloxanes. This fluid makes up about 1% to 3% of the composition weight.

(E) An organopolysiloxane release resin containing silanol groups, as described in the Merrill U.S. Pat. No. 4,028,339. It usually forms 12% to 20% of the composition weight. The quantity of the silicone release resin can vary from twice to fifteen times the weight of the silicone fluid (component D); preferably the ratio is 5:1 to 10:1.

(F) An organometallic curing catalyst in amount sufficient to cure the composition at ordinary temperature. Any of the organometallic catalysts which are effective in curing polyurethane resins are effective. The preferred catalysts are tin, zinc or iron salts of organic acids, such as dibutyltin dilaurate and zinc octanoate, in conventional solvents. The amount of catalyst metal in the formation is usually about 1% of the total weight of the silicones (D&E) although it can range from 0.5% to 2% of their weight.

(G) Suitable solvents for the constituents and the final composition.

The coating composition can comprise the seven components described above and can be applied directly to metal surfaces and cured thereon in time-temperature cycles of 30 seconds to one minute at temperatures of 450°–490° F. It is preferable, however, to combine polymer constituents (A through E) and appropriate solvents in one solution and maintain the organometallic catalyst in a second solution. The catalyst solution is then admixed with the polymer solution prior to application.

A less expensive coating procedure, which reduces the amount of expensive organopolysiloxanes required to cover a given area, comprises the application of a base coat to the metal surface, followed by application of the coating composition described above. The base coat is an epoxy phenolic resin, of the same general formulation described herein without the silicone components, with a colored pigment if desired, in a liquid organic carrier. It is coated on the metal surface, the carrier evaporated and the the coating cured in a very short time-temperature cycle. Thereafter the coating composition described above is applied and cured. By use of the base coat, the quantity of expensive ingredients for a given area is reduced.

In addition to the components (A to F) described above, other materials may be included in the coating composition to achieve certain desirable effects. For instance, silicones may be added for flow control of the compositions to provide smooth coatings on surfaces. Plasticizers may be included to improve film continuity and make the cured coating more flexible in the pan-forming operation. Other phenolic resins may be incorporated in the coating to resist the adverse effects of detergents in pan washing.

EXAMPLE 1

A flexible silicone top coating of wide applicability is produced in accordance with the following formula:

| | |
|---|---|
| High molecular weight bisphenol A-epichlorohydrin resin (min. mol. wt. 50,000 measured by gel permeation chromatography; hydroxyl no. 0.35; 32% solids in cellosolve ester | 420 lbs. |
| Isophorone | 10 lbs. |
| Etherified resol bisphenol-phenolic resin 50% solids in butanol; | 10 lbs. |
| Low molecular weight bisphenol A-epichlorohydrin resin (ave. mol. wt. 380; hydroxyl No. 0.06) | 5 lbs. |
| Mixture of methylphenylsiloxanes, dimethylsiloxanes and diphenyl-dimethylsiloxanes (G.E. silicone fluid 81950) | 8 lbs. |
| Silanol-containing methylphenyl-polysiloxane resin (Example I, U.S. Pat. No. 4,028,339) | 100 lbs. |
| Hydrocarbon solvent | 30 lbs. |
| Xylene | 30 lbs. |

The etherified resol bisphenol-epoxy resin and the low molecular weight bisphenol A-epichlorohydrin resin are dissolved in the isophorone and the resulting solution is mixed into the high molecular weight bisphenol A-epichlorohydrin resin. Then the two siloxane components are added followed by the hydrocarbon solvent and xylene.

To the resulting resin solution is added 3 lbs. of dibutyltin dilaurate in 6 lbs. of aliphatic hydrocarbon solvent and 6 lbs. of xylene. The resulting solution is a silicone coating composition which rapidly cures on metal surfaces (30 seconds at a metal temperature of 475° F.) and has a pot life of several days. Tin mill black plate coated with this composition can be drawn and shaped into muffin tins without rupturing the resin coating and the resulting miffin tins provide excellent release of baked goods.

EXAMPLE 2

Another flexible silicone top coating is produced in accordance with the following formula:

| | |
|---|---|
| High molecular weight bisphenol A-epichlorohydrin resin (min. mol. wt. 80,000 measured by gel permeation chromatography; hydroxyl no. 0.35; 32% solids in methyl ethyl ketone) | 464 lbs. |
| Isophorone | 60 lbs. |
| Etherified resol bisphenol-epoxy resin (50% solids in butanol; Araldite DP-139) | 18 lbs. |
| Low molecular weight bisphenol A-epichlorogydrin resin (ave. mol. wt. 380; hydroxyl No. 0.06) | 12 lbs. |
| Mixture of methylphenylsiloxanes, dimethylsiloxanes and diphenyldimethyl-siloxanes (G.E. silicone fluid 81950) | 16 lbs. |
| Silanol-containing methylphenylpoly-siloxane resin (Example, I, U.S. Pat. No. 4,028,339) | 144 lbs. |
| Hydrocarbon solvent | 54 lbs. |
| Xylene | 54.6 lbs. |

The etherified resol bisphenol-epoxy resin and the low molecular weight bisphenol A-epichlorohydrin resin are dissolved in the isophorone and the resulting solution is mixed into the high molecular weight bisphenol A-epichlorohydrin resin. Then the two siloxane components are added followed by the hydrocarbon solvent and xylene.

To the resulting resin solution is added 4 lbs. of dibutyltin dilaurate in 6 lbs. of aliphatic hydrocarbon solvent and 5.6 lbs. of xylene. The resulting solution is a silicone coating composition which cures rapidly at ambient temperature.

EXAMPLE 3

A flexible silicone top coating of wide applicability is produced in accordance with the following formula:

| | |
|---|---|
| High molecular weight bisphenol A-epichlorohydrin resin (min. mol. wt. 100,000 measured by gel permeation chromatography; hydroxyl no. 0.3; 30% solids in MEK) | 510 lbs. |
| Isophorone | 80 lbs. |
| Etherified resol bisphenol-epoxy resin (50% solids in butanol; Araldite DP-139) | 40 lbs. |
| Low molecular weight bisphenol A-epichlorohydrin resin (ave. mol. wt. 380; hydroxyl No. 0.06) | 20 lbs. |
| Mixture of methylphenylsiloxanes, dimethylsiloxanes and diphenyl-dimethylsiloxanes (G.E. silicone fluid 81950) | 22 lbs. |
| Silanol-containing methylphenyl-polysiloxane resin (Example I, U.S. Pat. No. 4,028,339) | 180 lbs. |
| Hydrocarbon solvent | 30 lbs. |
| Xylene | 30 lbs. |

The etherified resol bisphenol-epoxy resin and the low molecular weight bisphenol A-epichlorohydrin resin are dissolved in the isophorone and the resulting solution is mixed into the high molecular weight bisphenol A-epichlorohydrin resin. Then the two siloxane components are added followed by the hydrocarbon solvent and xylene.

To the resulting resin solution is added 6 lbs. of dibutyltin dilaurate in 9 lbs. of aliphatic hydrocarbon solvent and 8 lbs. of xylene. The resulting solution is a silicone coating composition which cures rapidly (1 minute at 450° F.) on tinplate.

We claim:

1. A fast-curing resin coating composition comprising:
   (i) 10-25 parts of an epoxy resin of molecular weight 50,000 to 200,000 measured by gel permeation chromatography,
   (ii) 1-3 parts of an etherified resol phenolic resin,
   (iii) 1-4 parts of an epoxy resin of molecular weight from 300 to 500,
   (iv) 1-3 parts of a silicone fluid comprised of methylphenylsiloxanes, dimethylsiloxanes and diphenyldimethylsiloxanes,
   (v) 12-20 parts of an organopolysiloxane release resin prepared by
      (a) agitating a mixture comprising (A) an organohalosilane blend consisting essentially of about 60 mole percent methyltrichlorosilane, about 35 mole percent phenyltrichlorosilane, and about 5 mole percent dimethyldichlorosilane, (B) water, (C) acetone, and (D) a water-immiscible organic solvent, wherein there is present by weight in said mixture per part by weight of (A), about 1.7 to about 10 parts of (B), about 0.2 to about 5 parts of (C), and about 0.3 to about 5 parts of (D); and
      (b) separating the organic solvent solution of (F) from the resulting hydrolysis mixture of step (i), wherein (F) is a silanol-containing organopolysiloxane resin having an average ratio of about 1.05 organic radicals per silicon atom,
   (vi) a catalytic amount of an organometallic curing agent, in a
   (vii) suitable solvent, all of the parts being parts by weight.

2. A resin composition according to claim 1 wherein the high molecular epoxy resin is a bisphenol A-epichlorohydrin resin.

3. A resin composition according to claim 2 wherein the etherified resol phenolic resin is a bisphenol-formaldehyde resin.

4. A resin composition according to claim 3 wherein the low molecular weight epoxy resin is an epichlorohydrin-bisphenol A resin with an epoxide equivalent of 175 to 200.

5. A resin composition according to claim 4 wherein the silanol-containing organopolysiloxane release resin is produced from phenyltrichlorosilane.

6. A resin composition according to claim 5 wherein the organopolysiloxane release resin is produced from a silane blend of methyltrichlorosilane, phenyltrichlorosilane and dimethyldichlorosilane.

7. A resin composition according to claim 6 wherein the silanol-containing organopolysiloxane release resin is produced from a silane blend of 526 parts of methyltrichlorosilane, 436 parts of phenyltrichlorosilane and 38 parts of dimethyldichlorosilane.

* * * * *